United States Patent
Gopi et al.

(10) Patent No.: US 12,465,719 B2
(45) Date of Patent: Nov. 11, 2025

(54) ACOUSTIC RESONANCE APPLIED AS A SLEEP AID

(71) Applicant: Sound Health Systems, Inc., Los Altos, CA (US)

(72) Inventors: Paramesh Gopi, Los Altos, CA (US); Bryant Lin, Los Altos, CA (US)

(73) Assignee: Sound Health Systems, Inc., Los Altos, CA (US)

( * ) Notice: Subject to any disclaimer, the term of this patent is extended or adjusted under 35 U.S.C. 154(b) by 0 days.

(21) Appl. No.: 18/210,386

(22) Filed: Jun. 15, 2023

(65) Prior Publication Data

US 2024/0416068 A1    Dec. 19, 2024

(51) Int. Cl.
*A61M 21/02* (2006.01)
*A61M 21/00* (2006.01)

(52) U.S. Cl.
CPC ..... *A61M 21/02* (2013.01); *A61M 2021/0027* (2013.01); *A61M 2205/3303* (2013.01); *A61M 2205/3306* (2013.01); *A61M 2205/3375* (2013.01); *A61M 2205/50* (2013.01); *A61M 2209/088* (2013.01); *A61M 2210/06* (2013.01); *A61M 2230/63* (2013.01)

(58) Field of Classification Search
None
See application file for complete search history.

(56) References Cited

U.S. PATENT DOCUMENTS

| | | | |
|---|---|---|---|
| 2013/0090520 A1* | 4/2013 | Redfield | H04R 1/1008 600/28 |
| 2015/0040296 A1* | 2/2015 | Hanson | A42B 3/069 2/411 |
| 2017/0135896 A1* | 5/2017 | Snow | A61H 23/00 |
| 2018/0250494 A1* | 9/2018 | Hanbury | A61B 5/6803 |
| 2021/0145692 A1* | 5/2021 | Gopi | A61H 23/0236 |
| 2021/0251845 A1 | 8/2021 | Gopi et al. | |
| 2021/0259918 A1 | 8/2021 | Zhang | |

FOREIGN PATENT DOCUMENTS

| | | | | |
|---|---|---|---|---|
| CN | 210811043 | | 6/2020 | |
| LR | 20110032563 | * | 3/2011 | A61M 21/02 |

* cited by examiner

*Primary Examiner* — Carrie R Dorna
(74) *Attorney, Agent, or Firm* — Dickinson Wright PLLC

(57) ABSTRACT

A system, method and device for integrating the application of acoustic resonance, as correlated with a wearer of the device, based on a volume of the wearer's skull. The aspects disclosed herein may be used to improve sleep. In one embodiment, the volume of the skull is achieved by using a photo of the wearer, and digital image processing used to extract crano facial points.

9 Claims, 9 Drawing Sheets

ACOUSTIC RESONANCE APPLIED AS A SLEEP AID

BACKGROUND

Obtaining healthy and continuous sleep is vital for maintaining and producing healthy living and outcomes. However, numerous individuals suffer from sleep-related issues and require various therapies to remedy this.

For example, an individual may consume a pharmaceutical as one such therapy. However, said pharmaceutical may include a whole host of negative side effects and may lose efficacy over time. As such, it is common for an individual to abandon this treatment. In another example, an individual may try expensive bedding or other electronic devices, such as a sound machine. However, these solutions also suffer from not being effective for numerous patients.

Various remedies may utilize sound. For example, numerous individuals attempt to augment sleep through the introduction of sound, e.g. through a sound machine. For example, white or pink noise may be introduced through a sound generating device, thereby blocking other noises and creating a buffer between outside noise and other environmental sounds. Furthermore, a noise machine may create a Pavlovian response teaching your mind that it's time to sleep.

The efficacy of sleep can be recorded through an EEG recording of a monitored individual. During sleep (often times referred to as REM sleep), four stages can be defined: This drowsy period, called stage I sleep, eventually gives way to light or stage II sleep, which is characterized by a further decrease in the frequency of the EEG waves and an increase in their amplitude, together with intermittent high-frequency spike clusters called sleep spindles. Sleep spindles are periodic bursts of activity at about 10-12 Hz that generally last 1 or 2 seconds and arise as a result of interactions between thalamic and cortical neurons. In stage III sleep, which represents moderate to deep sleep, the number of spindles decreases, whereas the amplitude of low-frequency waves increases still more. In the deepest level of sleep, stage IV sleep, the predominant EEG activity consists of low frequency (1-4 Hz), high-amplitude fluctuations called delta waves, the characteristic slow waves for which this phase of sleep is named. The entire sequence from drowsiness to deep stage IV sleep usually takes about an hour.

One such sound technique used in various sleep therapies is binaural beats. A binaural beat is an auditory illusion. It is perceived when two different pure-tone sine waves are presented to a listener, one tone to each ear.

For example, if a 530 Hz pure tone is presented to a subject's right ear, while a 520 Hz pure tone is presented to the subject's left ear, the listener will perceive the illusion of a third tone. The third sound is called a binaural beat, and in this example would have a perceived pitch correlating to a frequency of 10 Hz, that being the difference between the 530 Hz and 520 Hz pure tones presented to each ear.

FIG. 1 illustrates a prior art implantation of a binaural beats system 100. configured to automatically induce binaural beats in users. A user 102 is equipped with two or more electromagnetic measurement devices (e.g., electrodes 106 a-b) for measuring the user 102's brain electromagnetic activity. In various implementations, at least one measurement device (e.g., 106 a) measures electromagnetic activity from the left hemisphere of the user 102's brain, and at least one measurement device (e.g., 106 b) measures electromagnetic activity from the right hemisphere of the user 102's brain. The measurement devices are individually placed on or near the user 102's scalp, usually with a conductive gel. In some implementations, the measurement devices are placed in locations specified by the International 10-20 system. Alternatively, the measurement devices are integrated into an accessory such as eye glasses or headphones so that when the accessory is worn, the measurement devices are placed on or near the user 102's scalp. By way of illustration, measurement devices can be integrated into sides of eye glass frames, earphone covers, or other earphone parts.

In various implementations, the measurement devices 106 a-b are connected to one or more amplifiers (e.g., differential amplifier 128). However, other arrangements of measurement devices and amplifiers are possible. Each amplifier produces a frequency (e.g., in Hz) that represents the difference between its inputs, possibly multiplied by a constant factor. The amplifier can be realized as a hardware component or a software component (e.g., monitor 116). By way of illustration, if electrode 106 a measured a frequency of 8.4 Hz (Alpha rhythm) and electrode 106 b measured a frequency of 9 Hz (Alpha rhythm), the amplifier 128 would produce a frequency equal to 0.6 Hz multiplied by a constant. This is referred to as the frequency imbalance. If both electrodes 106 a-b measured the same frequency, the output of the amplifier 128 would be zero. If the two electrodes are measuring activity from different hemispheres of the user 102's brain, the amplifier 128 output indicates if the predominant frequency or rhythm (e.g., Alpha, Beta, etc.) is in a balanced or imbalanced state. In further implementations, a balanced state is an amplifier output from 0 Hz-T Hz and an imbalanced state is an amplifier output is greater than T Hz. The value of T can be determined based on a number of factors including the age of the user 102, medical conditions of the user 102, the predominate rhythm, and other factors.

The monitor component 116 receives digital or analog signals from the measurement devices 106 a-b and, optionally, the amplifier 128. In some implementations, the signals are processed before being received by the monitor component 116 to remove artifacts or noise, or to perform other processing. The connection between the measurement devices 106 a-b and the amplifier 128, and between the amplifier 128 and the monitor component 116 can be wired or wireless. The monitor component 116 determines the predominate rhythm based on the signals from the measurement devices. There are a number of ways the predominate rhythm can be determined. One approach is simply to average the frequencies measured by the measurement devices and identify which rhythm frequency range the average falls in. For instance, if electrode 106 a measured 14.5 Hz and electrode 106 b measured 16 Hz, the predominate rhythm would be Beta. Another approach is to use a weighted average of the frequencies where weights are assigned based on which region of the user 102's brain a given measurement device is measuring. Other approaches are possible. Using the received signals, the monitor component 116 can determine whether the predominate rhythm is in a balanced or imbalanced state in regards to the user 102's brain hemispheres. The predominate rhythm and an indication of the degree of imbalance are provided to the controller component 120.

The system 100 includes one or more computing devices 112 for execution of various software components, such as the monitor 116 and controller 120 components. Although several components are illustrated, there may be fewer or more components in the system 100. Moreover, the components can be distributed on one or more computing devices connected by one or more networks or other suitable communication means.

SUMMARY

The aspects disclosed herein are directed to a systems and methods for providing sleep therapy. The system includes a vibro acoustic resonant generator configured to provide resonance data; and a processor configured to generate resonance data, the resonance data being received by the acoustic resonance actuator, the resonance data corresponding to a resonant frequency based on a volume of the wearer's skull, The system is further defined by the vibro acoustic resonance generator is configured to deliver the acoustic resonance.

In another embodiment, the systems and methods are further defined so that, the resonance data is sourced from a facial scan of the wearer's face.

In another embodiment, the systems and methods are further defined that the acoustic resonance actuator is integrated in a band worn on the wearer's forehead.

In another embodiment, the systems and methods are further defined by the facial scan being a photograph of the wearer's face.

In another embodiment, the systems and methods are further defined by including a sensor.

In another embodiment, the systems and methods are further defined so that the sensor is one or more of the following, a breath cycle sensor, an EEG, a cortisol sensor, a skin sweat sensor, a lactate sensor, an accelerometer, a gyroscope, a microphone, a video camera, or a light sensor.

In another embodiment, the systems and methods are further defined, where the processor is configured to turn off the vibro acoustic resonance generator after receiving information from the sensor indicating that the wearer is asleep or in a sensed state associated with sleep.

In another embodiment, the systems and methods are further defined, where the processor is configured to modulate the vibro acoustic resonance generator after receiving information from the sensor indicating that the wearer is asleep or in a sensed state associated with sleep.

In another embodiment, the systems and methods are further defined wherein the sensor detects motion or sound, and after detecting said motion or sound, applying the acoustic resonance to the wearer.

DESCRIPTION OF THE DRAWINGS

The detailed description refers to the following drawings, in which like numerals refer to like items, and in which.

DETAILED DESCRIPTION

Figure 1:
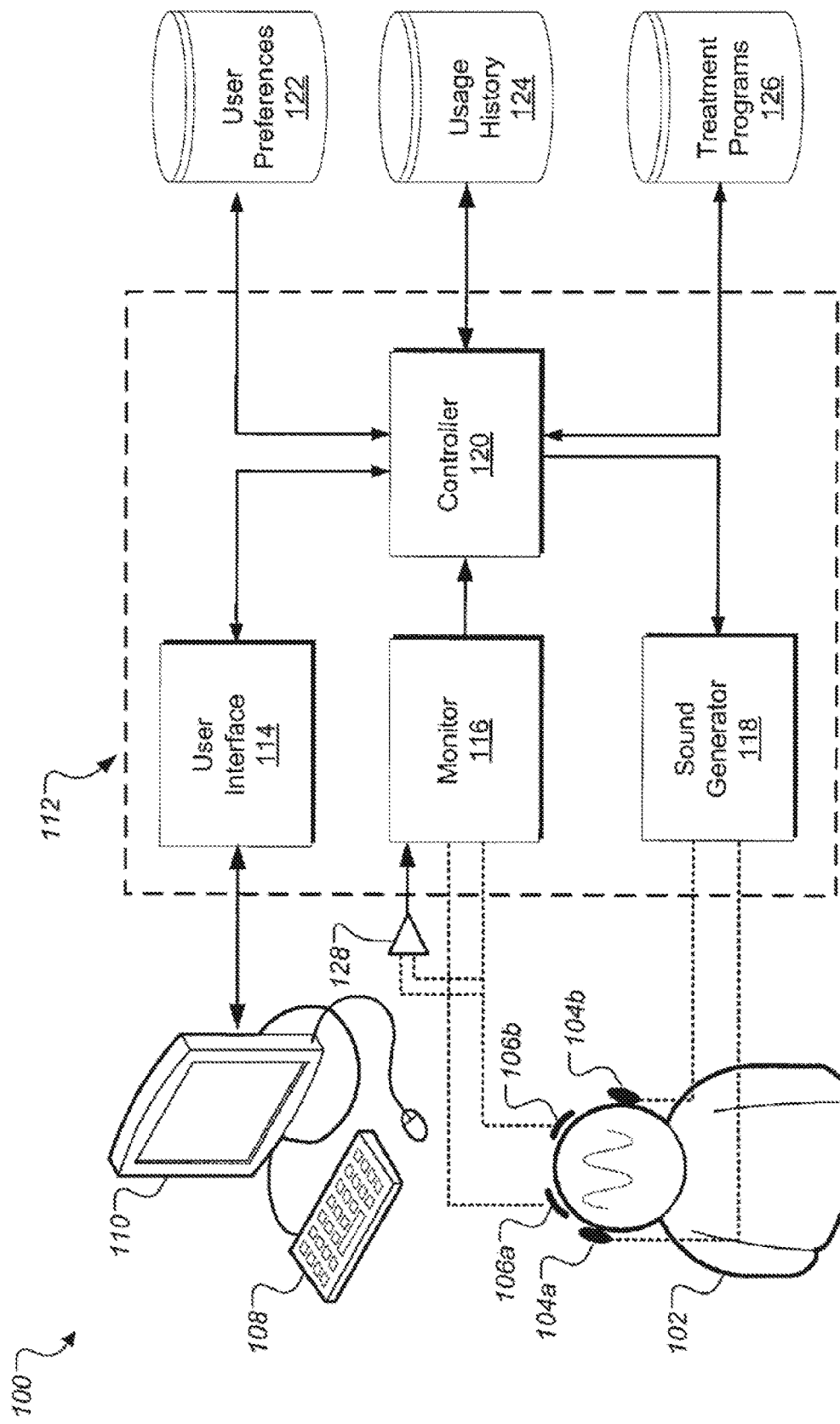
FIG. 1 illustrates a prior art implantation of a binaural beats system.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

In this disclosure, a sleep aid, a system for sleep therapy, and a method for providing sleep therapy is provided that allows a user to wear while sleeping, and more specifically, in a period before sleep is attained. Through the aspects disclosed herein, a user may wear the band, that is electrically coupled to a system that provides a sleep therapy aiding and improving the user's sleep. The system may be configured to individually provide a therapy based on a photographic picture of said user (for example, one taken via their mobile device). By picture, this refers to a photograph, such as one obtained from a mobile device the user may have on their person, and not other imaging techniques, such as, but not limited to 3D scans, a CT scan, or a MRI.

After said picture is obtained, an estimation of the user's skull volume may be achieved through the extraction of critical or relevant crano-facial points. After a volume of the skull is obtained, using any method, a resonant frequency is derived from the volume of the skull.

As disclosed in "Evaluation of Vibrational Modes of the Human Skull as it Relates to Bone-conducted Sound", Wislmer. Et. Al., *J Acoust Soc Am* 128, 2792-2797 (2010) —transforming bone conducting sound to create a resonance capable of vibrating a skull may be accomplished via the relationships discussed therein.

After which, the wearable device may then apply the resonant sound to the user in such a way to provide therapeutic outcomes to the wearer. This wearable device may be configured to apply said resonant sounds until the wearer falls asleep (either through a time out process or through information from one or more sensors).

For the purpose of this disclosure, the term user, patient, and wearer are used interchangeably, and will each apply to the wearer of the disclosed wearable band and the individual in which the sleep therapy is directed to.

Figure 2:
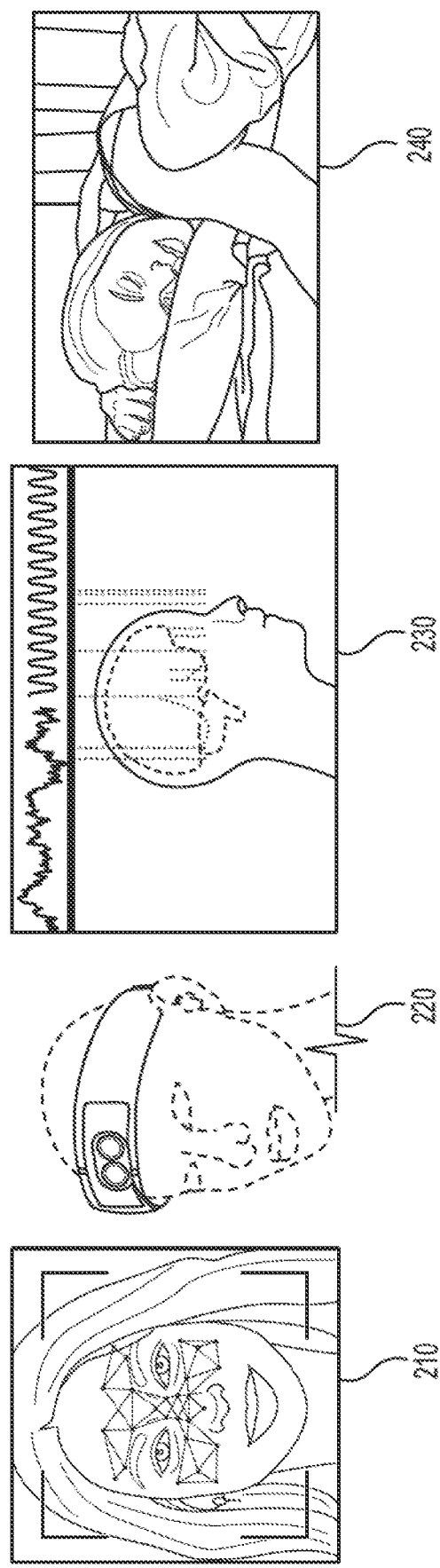
FIG. 2 illustrates a high-level flow diagram detailing the aspects disclosed herein.

FIG. 2 illustrates a high-level flow describing the aspects disclosed herein (the process of which will be shown in greater detail below). In a first step 210, a facial scan is done on a user (e.g. a photograph is taken). The facial scan obtains several key cranio-facial points through image processing of the exterior of the user's face. This may be performed by a user's personal computing device (not shown), such as, but not limited to a mobile device.

In step 220, after the image of the face is obtained, a vibro-acoustic sound is created based on the user's resonance (one exemplary method of obtaining said resonance is described herein). The user's resonance is calculated through the resonance associated with a volume of the estimated size of the user's skull (based on the crano-facial points obtained). The vibro-acoustic sound is then delivered to the user via a wearable band on said user's forehead.

The wearable band may include any speaker, however, in a preferred embodiment, the wearable band includes an embedded bone conduction speaker.

In another preferred embodiment, the wearable band includes at least two bone conduction speakers. Bone conduction speakers are well known in the art, and thus a detailed explanation will be omitted.

As described below, by utilizing two bone conduction speakers equidistantly spaced away a center point on a forehead, even when applying the same frequency, the effect of a binaural sound is replicated. As explained in the prior art, providing binaural sounds has been shown to effectively ease a patient into sleep.

In step 230, the effect of the treatment causes the brainwaves to re-harmonize. This re-harmonization causes and promotes sleep. The inventors, through testing, have discovered the combination of applying a correct resonant frequency (such as one obtained from scanning facial features), at 5 cycles/second (similar to the optimal frequency of theta waves during sleep), in application via a forehead portion of the user, leads to improved sleep as well as quicker attainments of a sleep state.

In step 240, after a detection of the user being asleep, the wearable band may turn off (either immediately or through a tapering process). In the disclosure below, several embodiments of instigating this shut off step will be described, such as, but not limited to, a time out function, a biometric sensor, an accelerometer, a microphone, or some combination thereof.

Figure 3:
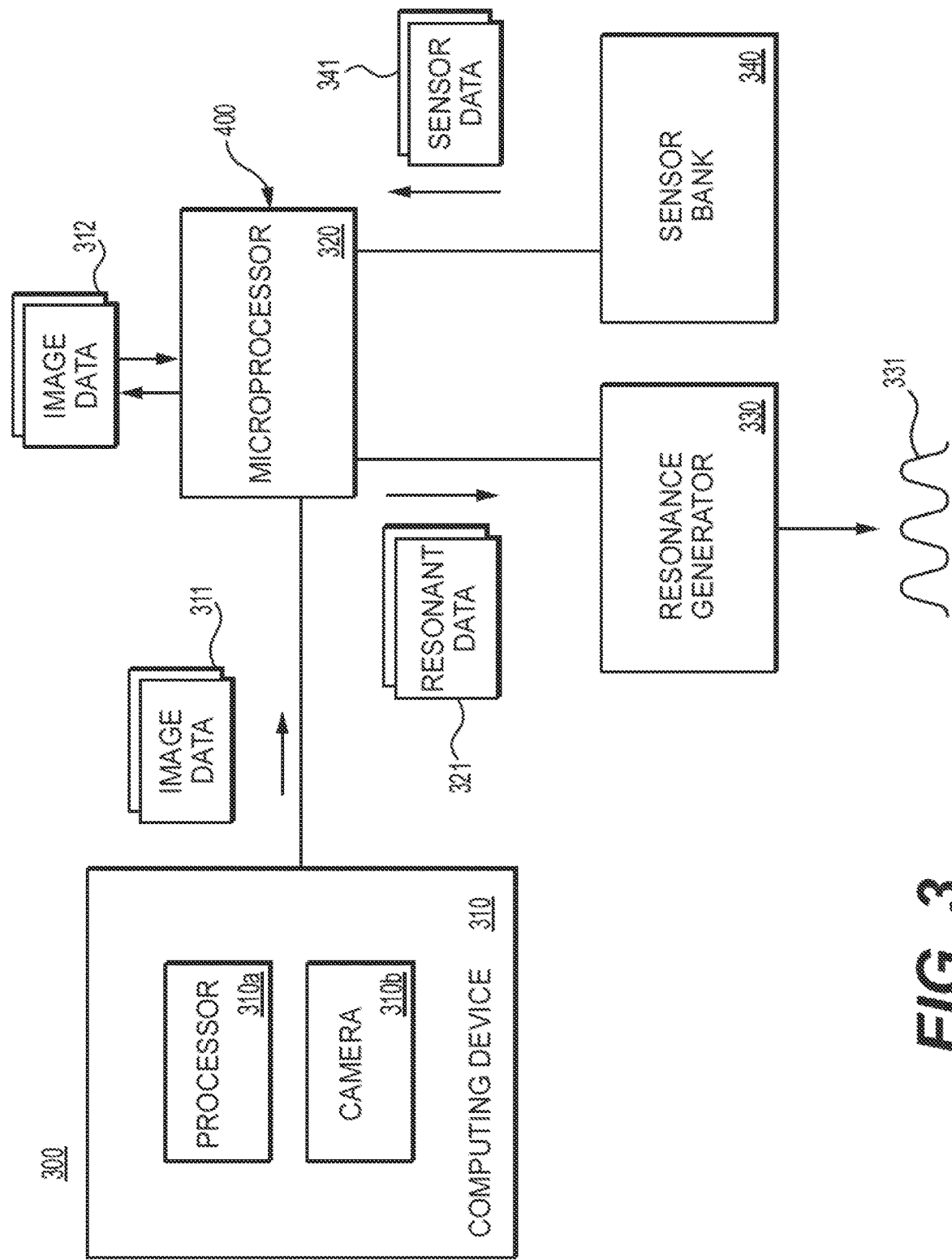
FIG. 3 illustrates a system for providing sleep therapy according to the aspects disclosed herein.

FIG. 3 illustrates an embodiment of the employment of a system 300 disclosed herein. The system 300 includes a computing device 310 (with processor 310a and camera 310b), a microprocessor (or microcontroller) 320 (or any device capable of storing instructions and communicating with various input/output devices that may be coupled to a wearable band), a vibro acoustic resonance generator 330 and a sensor bank 340. In some embodiments of the disclosed system, the sensor bank 340 may be omitted. The processor 310a and the camera 310b may be included in a singular device, such as a personal mobile device (computing device 310).

The system 300 shown is merely exemplary, and it will be appreciated that various components herein may be included or excluded based on the methods disclosed herein and the corresponding operations and disclosed concepts.

Figure 6B:
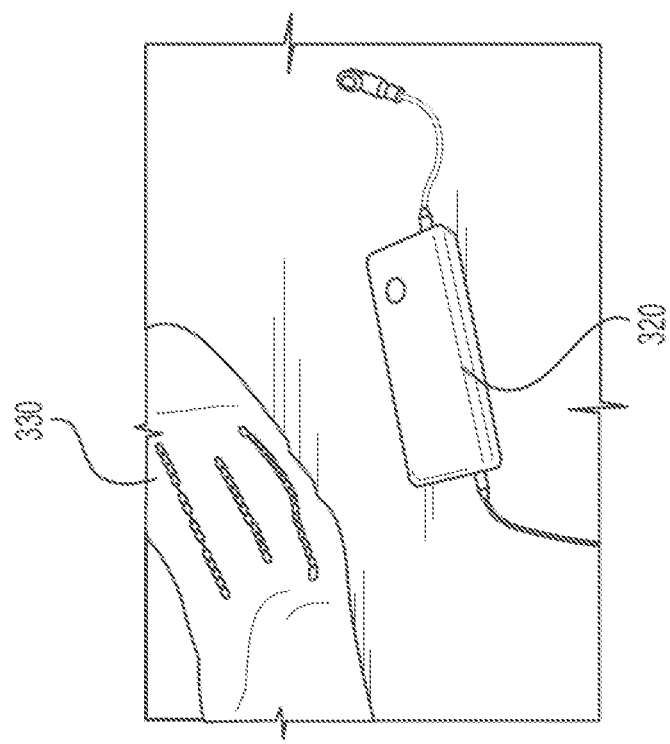
FIGS. 6(a) and (b) illustrate a wearable band according to the aspects disclosed herein.
Figure 6A:
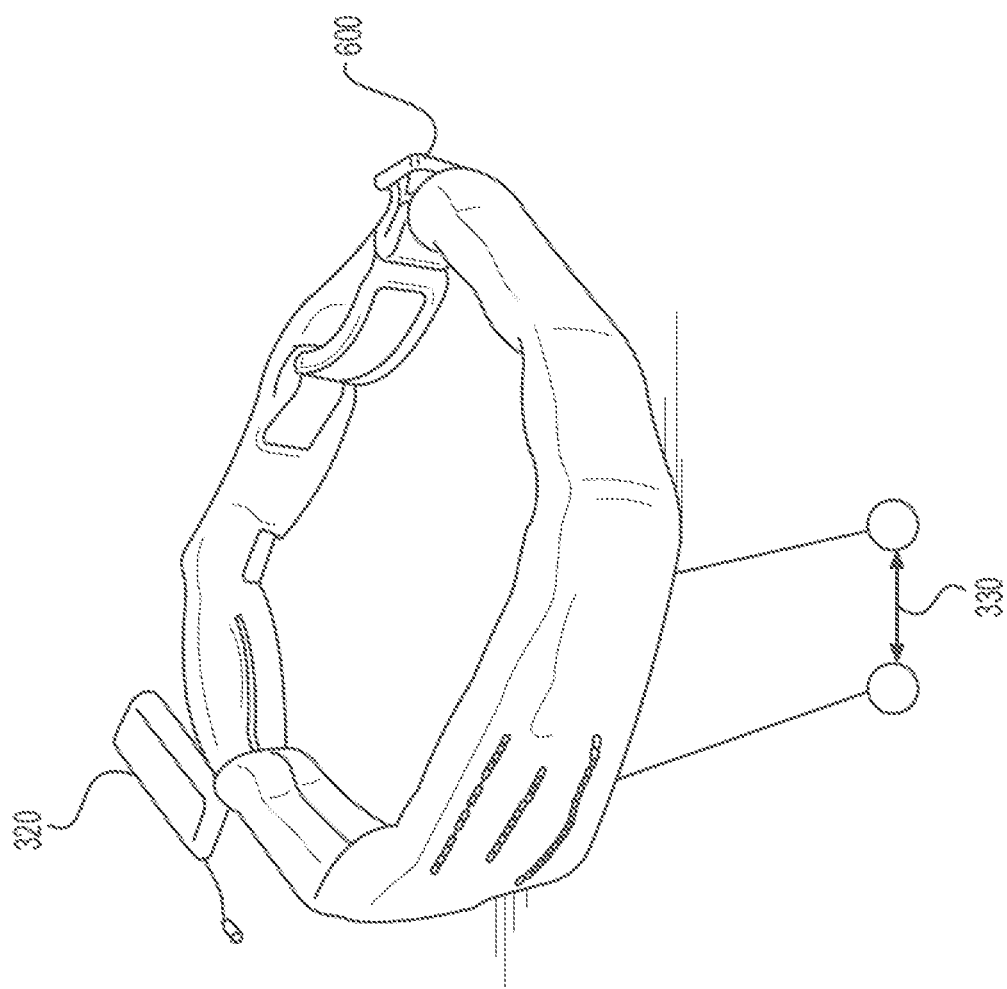

The vibro acoustic resonance generator 330 and the sensor bank 340 are implemented in a wearable device 600 (as shown in FIGS. 6(a) and (b)).

As shown in FIG. 3, a computing device 310 is electrically coupled to a microcontroller 320. The microcontroller 320 may be any processing device configured to electrically drive a vibro acoustic resonance generator 330. In one embodiment, the microcontroller 320 is included along with the computing device 310. However, according to the aspects disclosed herein, the microcontroller 320 may be embedded in a wearable device 600.

Figure 4A:
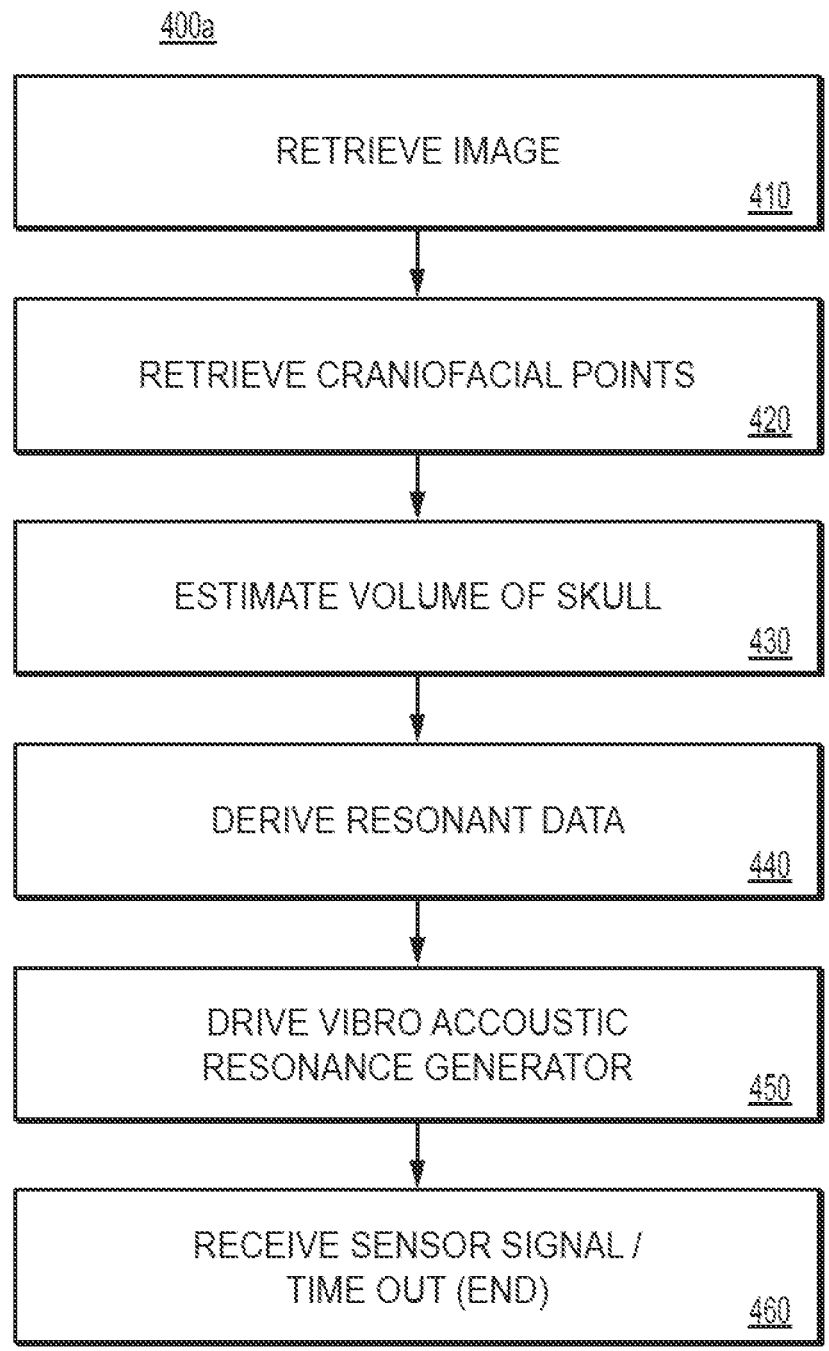
FIGS. 4(a) and (b) illustrate methods of providing sleep therapy according to aspects disclosed herein.

Alternatively, various instructions associated with the microcontroller 320 may be separately provided in both the computing device 310a and the microcontroller 320. For example, as explained in FIGS. 4(a) and (b), the process of retrieving the image may be performed via computing device 310, while the other aspects may be performed via microcontroller 320.

The microcontroller 320 is electrically coupled to a vibro acoustic resonance generator 330. In other embodiments, the microcontroller 320 may additionally be electrically coupled to a sensor bank 340.

The vibro acoustic resonance generator 330 is any device capable of generating a vibro acoustic sound. As discussed above in FIG. 2, in a preferred embodiment, the vibro acoustic resonance generator 330 may be a bone conduction speaker (or a plurality of bone conduction speakers).

Bone conduction speakers can convert an electrical signal into a mechanical vibration signal, and transmit the mechanical vibration signal into a human auditory nerve through human tissues and bones so that a wearer of the speaker can hear the sound.

Also shown in FIG. 3, is a sensor bank 340. The sensor bank 340 may or may not be provided, depending on which embodiment is implemented. The sensor bank 340 can serve two functions.

The first function is based on sensed data 341, the sensor bank 340 may communicate a signal to the microcontroller 320 to turn off and/or modulate the resonance data 321.

Figure 4B:
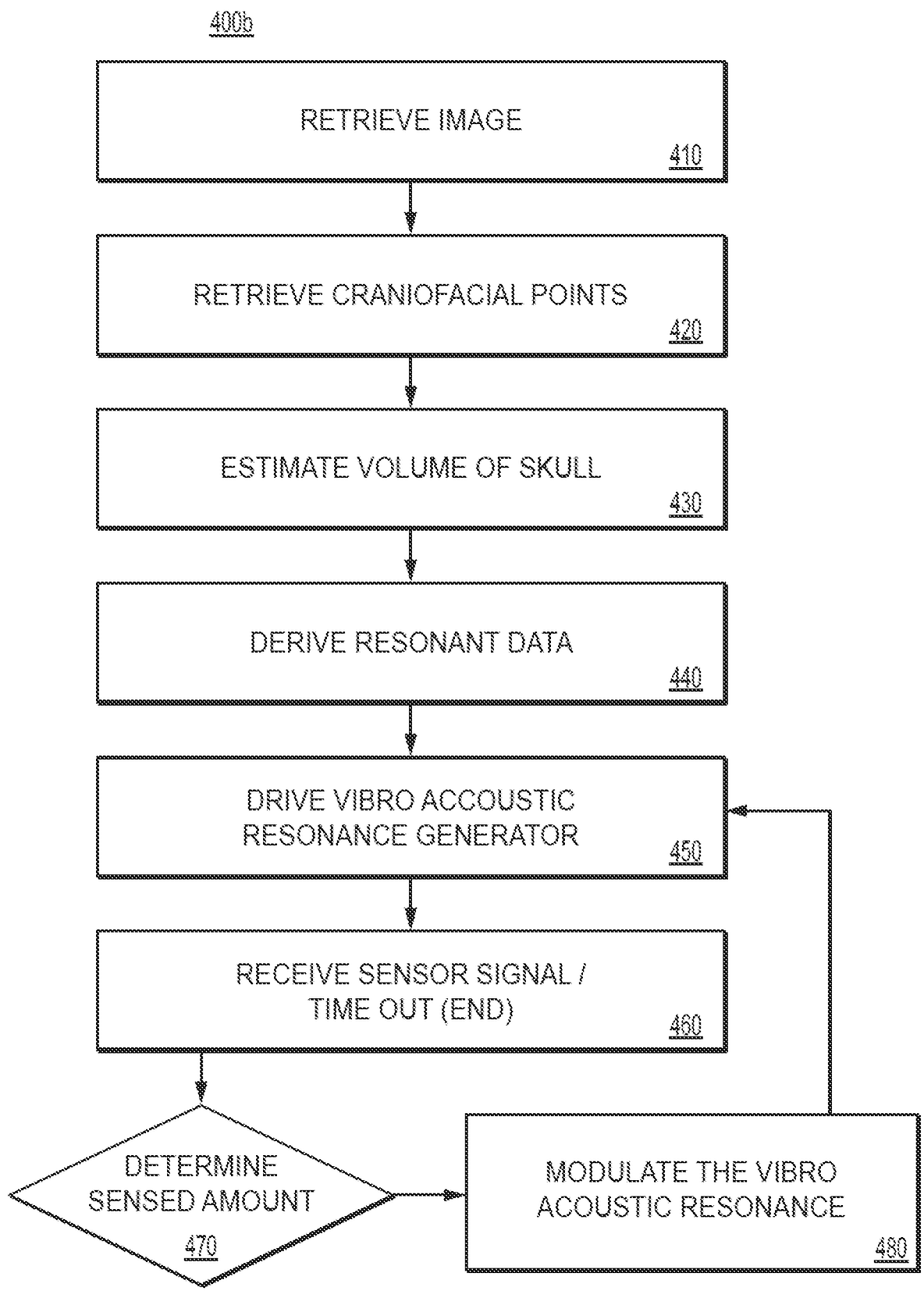

FIG. 4 illustrates a method 400a explaining an implementation of system 300. The system 300 may include any computer or processor (or combination thereof multiple processors) capable of storing and executing instructions. For example, the system 300 may be implement with a user's mobile computing device and a wearable band.

Figure 5A:
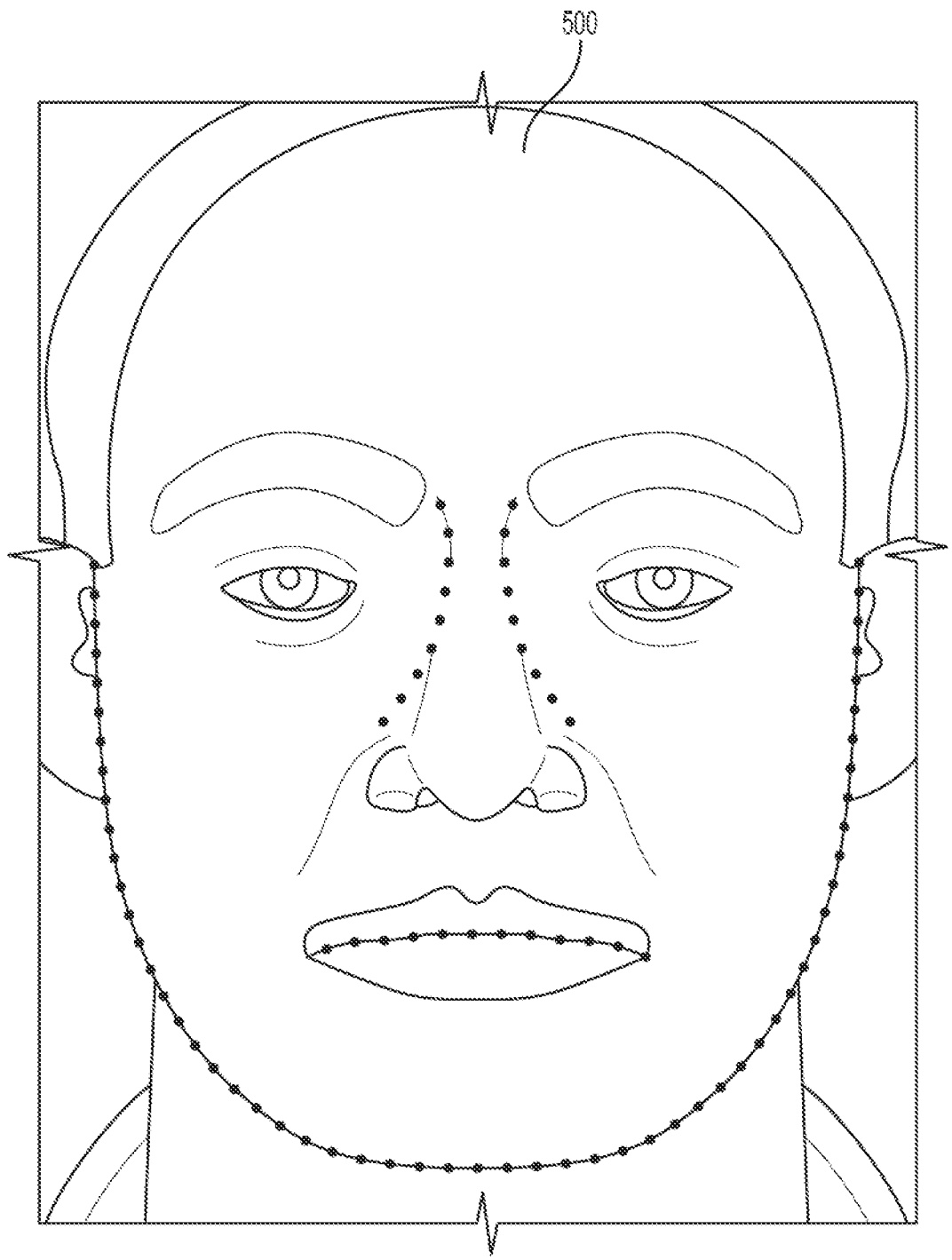
FIGS. 5(a)-(c) exemplify a portion of the operation of the system of FIG. 3 and the methods of FIGS. 4(a) and (b)
Figure 5B:
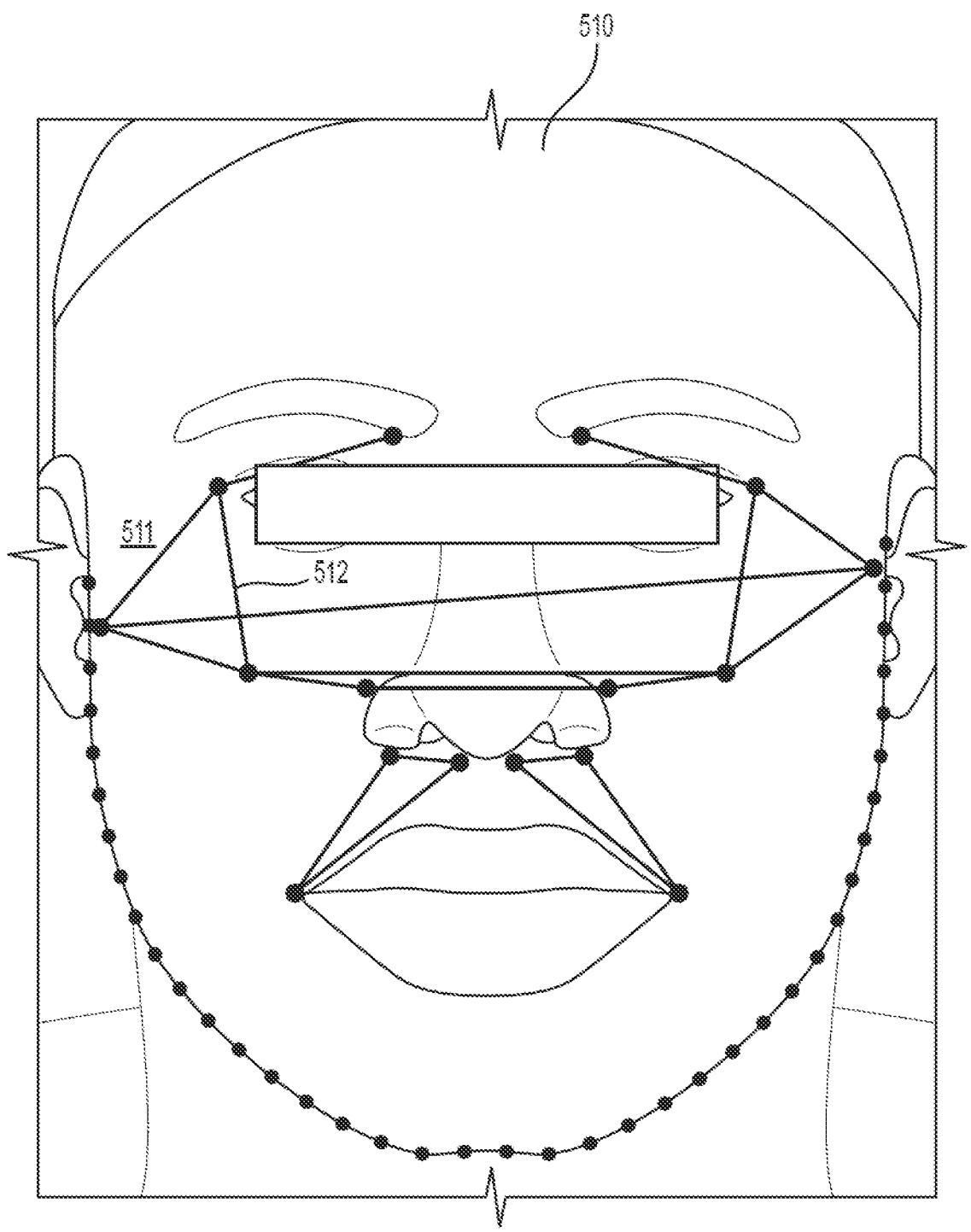
Figure 5C:
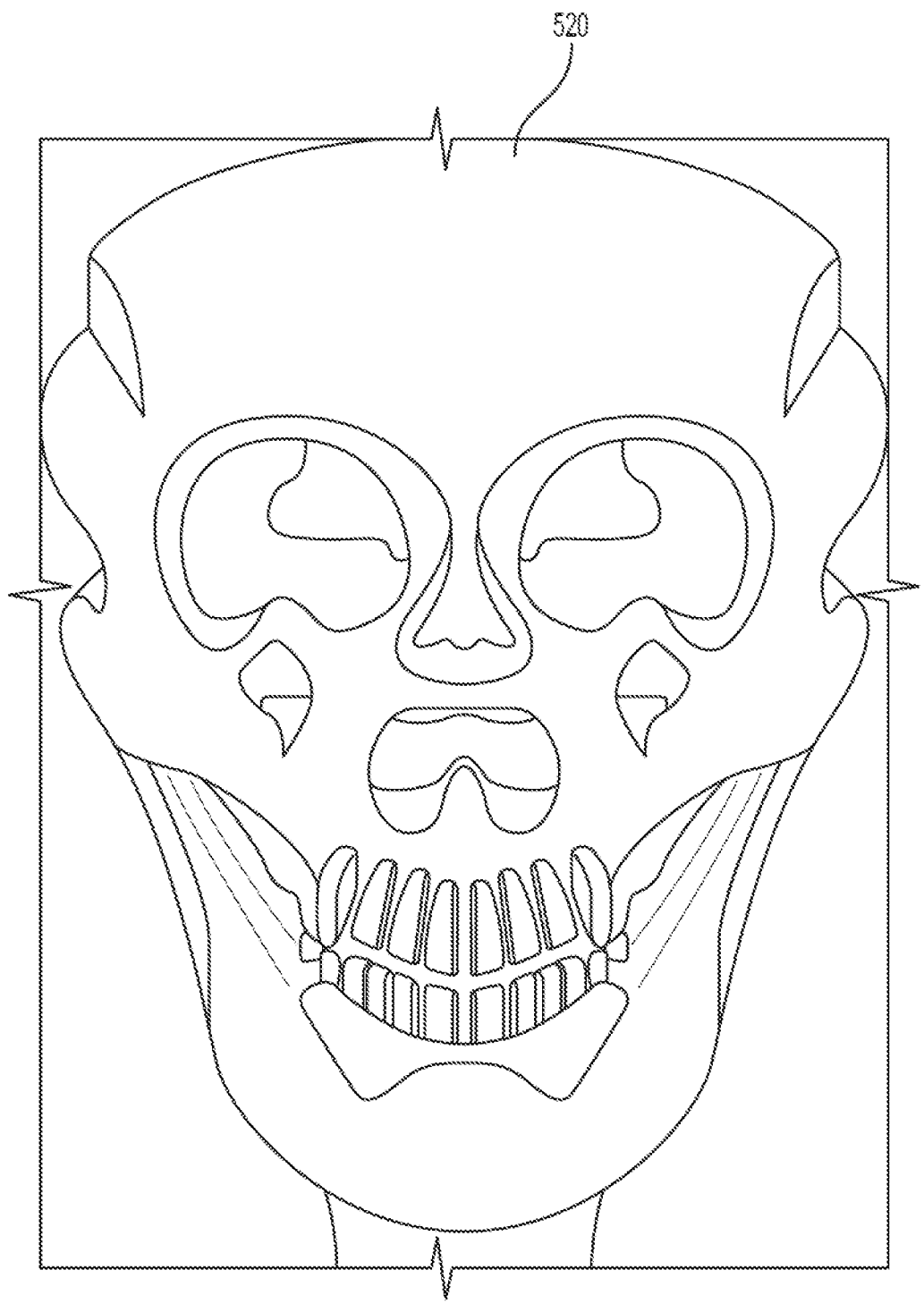

FIGS. 5(a)-(c) illustrate an example of converting extracted cranio facial points into vibro acoustic resonance data. FIGS. 5(a)-(c) will be utilized to illustrate the systems and methods disclosed herein. The image shown in FIGS. 5(a)-(c) is a digital representation of a face of the user/patient receiving the therapies disclosed herein.

In step 410, an image of the user is retrieved (as image data 311). This may occur by using camera 310b. In another exemplary embodiment, a previous stored image of the patient's face is used, and thus a camera is not necessary. As shown in FIG. 5(a), a graphical depiction of a capture face 500 is shown (image data 311).

In step 420, the microcontroller 320, which is either implemented in processor 310a or separately provided (in parts or whole), transforms the image data 311 into image data 312. The image data 312 is a collection of measurements associated with the user's face 500. The image data 311 is process and various crano-facial points (such as those shown in FIG. 5(b) are extracted. Also included in image data 312 are measurements associated with distances between each crano-facial point.

The measurements used are not limited to the exemplary embodiment disclosed herein, as other combination of measurements that produce a resonant sound may also be employed.

FIG. 5(b), shows crano-facial points 511 extracted from face 500. These crano-facial points may be various defined features, such as (but not limited) to all potential craniofacial points between the edge of the orbit to the nasion or glabella. In addition to obtaining the crano-facial points 511, distances 512 between each crano-facial points 511 are also obtained.

In step 430, a volume of the skull 520 is obtained. In an example disclosed herein, the volume of the skull 520 corresponds to a calculated or estimated size (shown in FIG. 5(c)). This may be obtained by using measurements in image data 312, and specifically the locations of the crano-facial points 511 and the distances 512.

Various different methodologies may be used to obtain a volume of skull through a photo of the user. By obtaining a volume of the skull through merely image of the user (as opposed to 3D imaging, CT Scans or other methods), the system 300 may be implemented via just a personal computing device and a wearable device.

One exemplary method for using crano-facial points to determine a volume of a skull is listed below:
1. Use the 3d length between a nasion and an eye socket end to estimate circumference (this distance may be correlated with a predetermined correlation to an estimated circumference).
2. Use the 3d length between the tragus ear lobe and nasion to further estimate or clarify the circumference (thus, both the measurements in steps 1 and/or 2 may be used to estimate the circumference, for example using a lookup table where defined measurements are correlated to estimated circumferences)
3. Use the 3D length between the nasospinale-lib point and glabella to estimate skull cap height.

Thus, having a circumference and a skull cap height (estimated), may then be used to determine the volume of the skull (because both the major and minor axis of the half sphere and ellipsoid may be derived with at least those two values).

In step 440, the volume of the skull 520 is converted to resonant data 321. The resonant data 321 of the skull 520 corresponds to the singular resonant frequency of the cavity portion of the skull.

An air cavity will exhibit a single resonant frequency. If extra air is pushed into the volume and then released, the pressure will drive it out. But, acting somewhat like a mass on a spring which is pulled down and then released, it will overshoot and produce a slight vacuum in the cavity. The air will oscillate into and out of the container for a few cycles at a natural frequency. The qualitative nature of the frequency determining factors.

The frequency depends upon the square root of these factors and also upon the speed of sound, as the actual calculation of the frequency.

Thus, by knowing the volume of the skull 520, as well as the dimensions of the various apertures of said skull 520, a cavity resonance may be derived.

In step 450, the microcontroller 320 communicates the resonance data 321 to the vibro acoustic resonance generator 330, to produce a resonant sound 331. As explained above, the vibro acoustic resonance generator 330 may be any sound producing device capable of receiving resonance data 321 to produce resonant sound 331. The vibro acoustic generator 330 in an exemplary embodiment, is included in a wearable band 600 situated on the user's forehead (see FIG. 6 for an example of said band). The vibro acoustic resonance data 321 is capable of driving the vibro acoustic resonance generator 330 to produced a resonant sound 331. In one exemplary embodiment, the resonant sound is driven at 5 cycles per second. The value of 5 cycles per second is optimally chosen to match with a user's sleep pattern.

As explained above, the vibro acoustic resonance generator 330 may be implemented with at least two bone conduction speakers situated equidistant from the center of a forehead. As such, a marking indicating this center portion may be provided on the wearable band 600, so that a user may situate and align said marking with the center bridge of their nose.

By providing the at least two bone conduction speakers equidistant from the center, even when a single resonant sound 331 is produced, a binaural effect is created.

In one preferred embodiment, the distance of the bone conduction speakers may be altered by a user.

In another preferred embodiment, the distance of the bone conduction speakers may be correlated with the user's head size.

In step 460, the microcontroller 320 is configured to turn off the vibro acoustic resonance generator 330. The microcontroller 320 may instigate this turn off through a variety of non-limiting methods, such as:
1. A time out feature, where the application of vibro acoustic resonance sound is configured to be applied for a predetermined period of time; and/or
2. Via communication with a sensor 340 (or a combination of multiple sensors). The sensor 340 may be one or more of the following (while the primary purpose of the sensor would be to indicate control of vibro acoustic resonance generator 330, a secondary application would be to sense aspects of the environment and correlate it with sleep patterns associated with the wearer):

Breath Cycle—a sensor (e.g. via a microphone) to detect the user's breathing patterns;
EEG—a sensor to detect brain waves;
Cortisol—a sensor to detect sweat;
Skin Sweat—a sensor to determine galvanic skin response;
Lactate—a sensor to determine lactate concentration;
Accelerometer—a sensor to detect the user's movement;
Gyroscope—a sensor to detect the user's position;
Sound—a sensor to detect whether the user is snoring or making any other noise associated with sleep;
Video camera—provided to determine the user's sleeping environment;
Light Sensor (UV exposure)—provided to determine the user's sleeping environment.

FIG. 4(*b*) illustrates an alternative embodiment of the method 400*b*. I In contrast to FIG. 4(*a*), the method 400*b* proceeds to step 460, in which a sensor 340 communicates sensed information about the wearer to the microprocessor 320. At this time, the method then proceeds to step 470, where a determination is made.

The determination is an amount in which to modulate an element of the vibro acoustic resonant data 331 in response to a signal associated with the sensor 340. The modulation of the vibro acoustic resonant data 331 is defined by modifying the base frequency and the key harmonics (thus, not altering the resonant frequency).

In step 480, a signal is sent to the vibro acoustic resonant generator with the calculated modulated amount as applied to the vibro acoustic resonant data 331. The method 400*b* then returns to step 450 and this step is iteratively performed until the sensed data indicates the therapy should stop, or if a time out condition is reached.

For example, if the sensor 340 is an accelerometer, the sensor 340 may be record that the movements of the user are occurring at a lesser frequency. In accordance with an implementation of the system 300, the frequency of application of the vibro acoustic resonance generator 330 may be lessened or dampened by a correlated amount (in either sound level or frequency). Conversely, if the sensor 340 detects an indication that sleep is getting worse (i.e., moving more), the vibro acoustic resonance generator 330 may be increased in either sound level or frequency.

In one embodiment, a relationship between the change in the sensed data and the frequency of application may be defined. Alternatively, or in addition to, a lookup table may be embedded in the system, correlating ranges of the sensed data with a specified frequency of application.

FIGS. 6(a) and (b) an example of the wearable band 600 is illustrated. As shown in FIG. 6, the microcontroller 320 is embedded in the wearable band 600 (it's shown separately in an attached unit for illustrative purposes, however, it may be provided integrally in said wearable band 600). Additionally, and as explained above, the operation of the microcontroller 320 may be replicated in the mobile device 310 as a set of instructions stored on a non-volatile memory installed on said mobile device 310.

As shown in FIG. 6, the wearable band 600 includes a microcontroller 320 and a vibro acoustic resonance generator 330. Additionally included is a sensor bank 340 (not shown). As explained above, in some embodiments the aspects disclosed herein may include none, one, or all of the sensors disclosed herein.

As explained in FIGS. 3 and 4, the sensor bank 340 detects a sensed parameter of the user, indicating the user is either likely asleep or awake. When the user is exiting wake state, and entering sleep state, the sensor bank 340 may communicate sensed data 341 to the microcontroller 320, thereby instructing the microcontroller 320 to control the vibro acoustic resonant generator 330 to stop producing the resonant sound 331.

Conversely, when the user exits a sleep state and enters a wake state, as indicated by the one or more sensors of the sensor bank 340 may communicate sensed data 341 to the microcontroller 320, thereby instructing the microcontroller 320 to control the vibro acoustic resonance generator 330 to produce the resonant sound 331.

As explained above, the sensor bank 340 may be a single sensor, or a collection of sensors as enumerated in the list above.

In an alternate embodiment (per method 400b), the sensed data 341 may be correlated to a level of the volume or the amplitude of the resonant sound 331. For example, if the user is moving less (but hasn't stopped), the sensed data 341 may be correlated to a reduced volume of the resonant sound 331.

In an alternate embodiment, the band 600 may be configured to alter the resonant sound 331 by step levels. After which, the step levels may be recorded along with the sensed data 341. The band 600, through a learning phase, may be able to determine the best and optimal resonant sound 241.

Certain of the devices shown in the above figures include a computing system (for example computing device 310 and microcontroller 320). The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIGS. 4(a) and (b) is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for providing sleep therapy, comprising:
an acoustic resonance actuator in a band adapted to be worn on a wearer's forehead; and
a processor configured to generate resonance data, the resonance data being received by the acoustic resonance actuator, the processor being configured to generate the resonance data representing a resonant frequency calculated by a relationship using a numerical value of a volume of the wearer of the acoustic resonance actuator's skull,
wherein the vibro acoustic resonance actuator is configured to deliver the resonance data to the wearer of the acoustic resonance actuator, the acoustic resonance actuator being configured to apply vibro acoustic sound corresponding to the resonant frequency.

2. The system according to claim 1, the resonance frequency is sourced from a facial scan of the wearer's face.

3. The system according to claim 2, the facial scan is a photograph of the wearer's face.

4. The system according to claim 2, further comprising a sensor.

5. The system according to claim 4, wherein the sensor is one or more of the following:
a breath cycle sensor, an EEG, a cortisol sensor, a skin sweat sensor, a lactate sensor, an accelerometer, a gyroscope, a microphone, a video camera, or a light sensor.

6. The system according to claim 5, wherein the processor is configured to control the sensor to detect motion or sound, and after detecting said motion or sound, the vibro acoustic resonance actuator is adapted to apply the acoustic resonance to the wearer.

7. The system according to claim 4, wherein the processor is configured to turn off the vibro acoustic resonance actuator after receiving information from the sensor indicating that the wearer is asleep or in a sensed state associated with sleep.

8. The system according to claim 4, wherein the processor is configured to modulate the vibro acoustic resonance actuator after receiving information from the sensor indicating that the wearer is asleep or in a sensed state associated with sleep.

9. The system according to claim 1, wherein the acoustic resonance actuator is defined by at least two bone conduction speakers.

* * * * *